United States Patent
Hesar et al.

(10) Patent No.: US 12,470,287 B2
(45) Date of Patent: Nov. 11, 2025

(54) AUTOMATED METHOD FOR SATELLITE CONJUNCTION ASSESSMENT AND COLLISION AVOIDANCE

(71) Applicant: Kayhan Space Corp., Boulder, CO (US)

(72) Inventors: Siamak Hesar, Boulder, CO (US); Araz Feyzi, Boulder, CO (US)

(73) Assignee: Kayhan Space Corp., Boulder, CO (US)

( * ) Notice: Subject to any disclaimer, the term of this patent is extended or adjusted under 35 U.S.C. 154(b) by 421 days.

(21) Appl. No.: 18/080,633

(22) Filed: Dec. 13, 2022

(65) Prior Publication Data

US 2023/0188203 A1 Jun. 15, 2023

Related U.S. Application Data

(60) Provisional application No. 63/305,047, filed on Jan. 31, 2022, provisional application No. 63/288,932, filed on Dec. 13, 2021.

(51) Int. Cl.
*H04B 7/185* (2006.01)

(52) U.S. Cl.
CPC ..... *H04B 7/18519* (2013.01); *H04B 7/18513* (2013.01); *H04B 7/18521* (2013.01)

(58) Field of Classification Search
CPC ............ H04B 7/18513; H04B 7/18519; H04B 7/18521
See application file for complete search history.

(56) References Cited

U.S. PATENT DOCUMENTS

| | | | | |
|---|---|---|---|---|
| 2013/0327893 A1* | 12/2013 | Lee | ...................... | B64G 1/2427 244/158.6 |
| 2015/0355324 A1* | 12/2015 | Minear | .................... | G01S 13/93 342/146 |
| 2020/0277087 A1* | 9/2020 | Kaen | ....................... | B64G 1/242 |
| 2020/0354089 A1* | 11/2020 | Yakimenko | .............. | B64G 1/26 |
| 2022/0081132 A1* | 3/2022 | Mukae | ..................... | B64G 3/00 |

FOREIGN PATENT DOCUMENTS

KR 20130073624 A * 7/2013 ............. G01S 19/38

\* cited by examiner

*Primary Examiner* — Raymond S Dean
(74) *Attorney, Agent, or Firm* — Run8 Patent Group, LLC; Peter Miller

(57) ABSTRACT

A method including: receiving a conjunction data message representing a first conjunction between a first satellite and a second satellite; in response to identifying the first satellite as maneuverable, in response to identifying the second satellite as maneuverable, and in response to a probability of collision exceeding a threshold probability of collision, and in response to detecting absence of agreement between the first operator and the second operator, generating an operative agreement based on a first set of satellite characteristics and a second set of satellite characteristics, and transmitting an agreement message to the first satellite operator and the second satellite operator; and in response to acceptance of the operative agreement by the first satellite operator and the second satellite operator, generating a first avoidance plan for the first satellite, and generating a second avoidance plan for the second satellite.

14 Claims, 6 Drawing Sheets

AUTOMATED METHOD FOR SATELLITE CONJUNCTION ASSESSMENT AND COLLISION AVOIDANCE

CROSS-REFERENCE TO RELATED APPLICATIONS

This Application claims priority to U.S. Provisional Patent Application No. 63/305,047, filed on 31 Jan. 2022, and U.S. Provisional Patent Application No. 63/288,932, filed on 13 Dec. 2021, each of which is incorporated in its entirety by this reference.

TECHNICAL FIELD

This invention relates generally to the field of satellite operation and more specifically to a new and useful automated method for orbital conjunction assessment and collision avoidance in the field of satellite operation.

DESCRIPTION OF THE EMBODIMENTS

Figure 1:
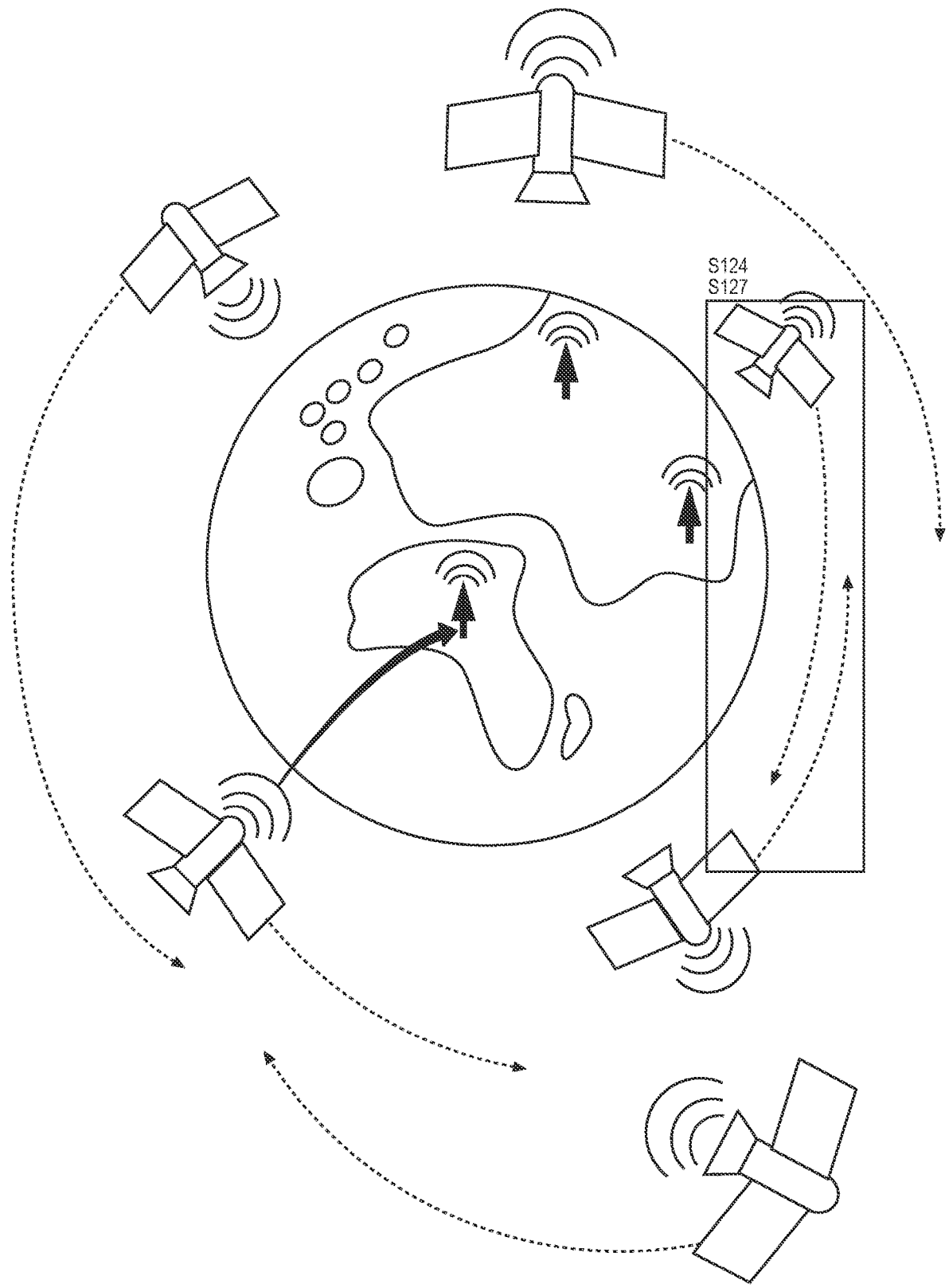
FIG. 1 is a schematic representation of satellite orbit trajectories.
Figure 2:
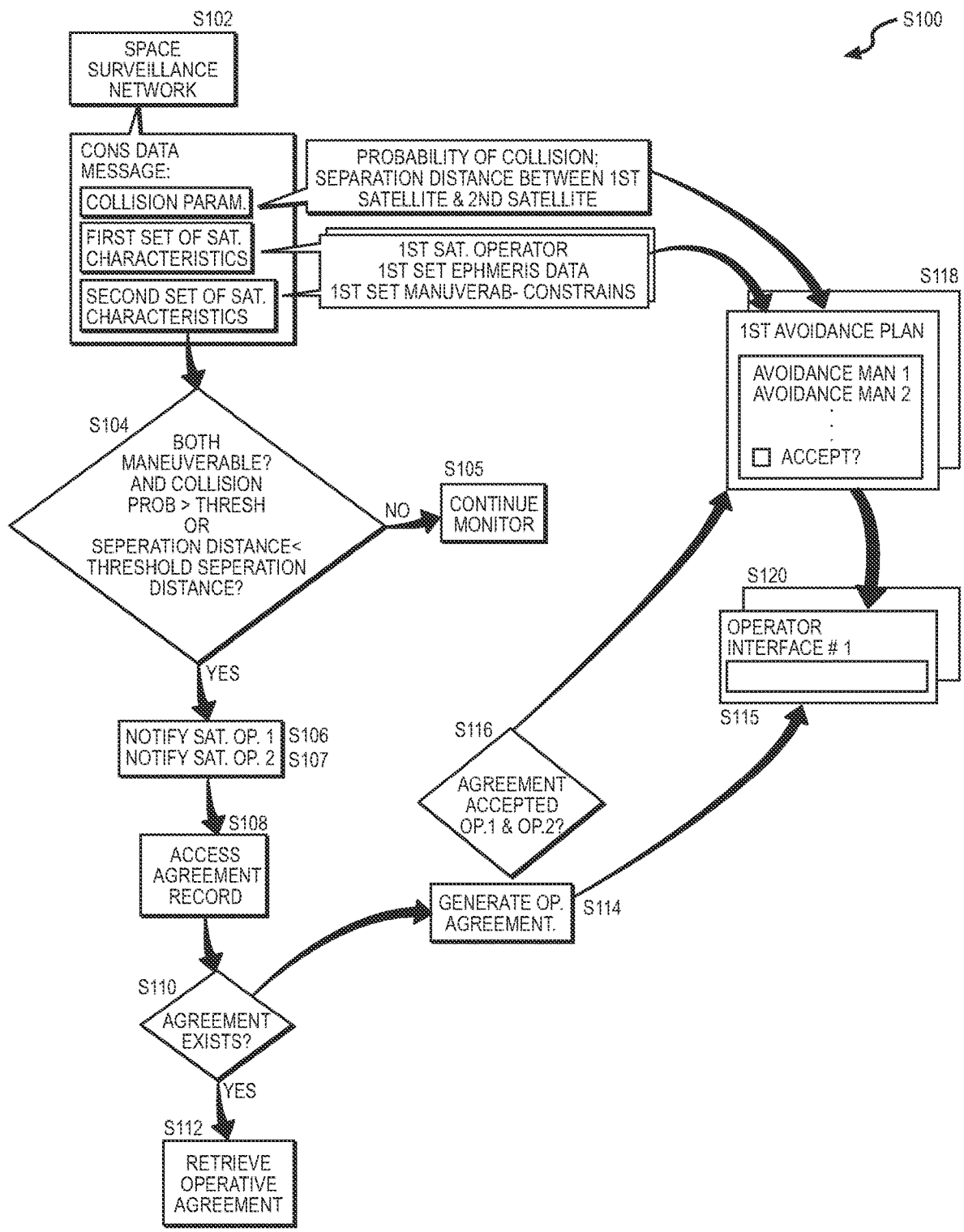
FIG. 2 is a schematic representation of a method.
Figure 3:
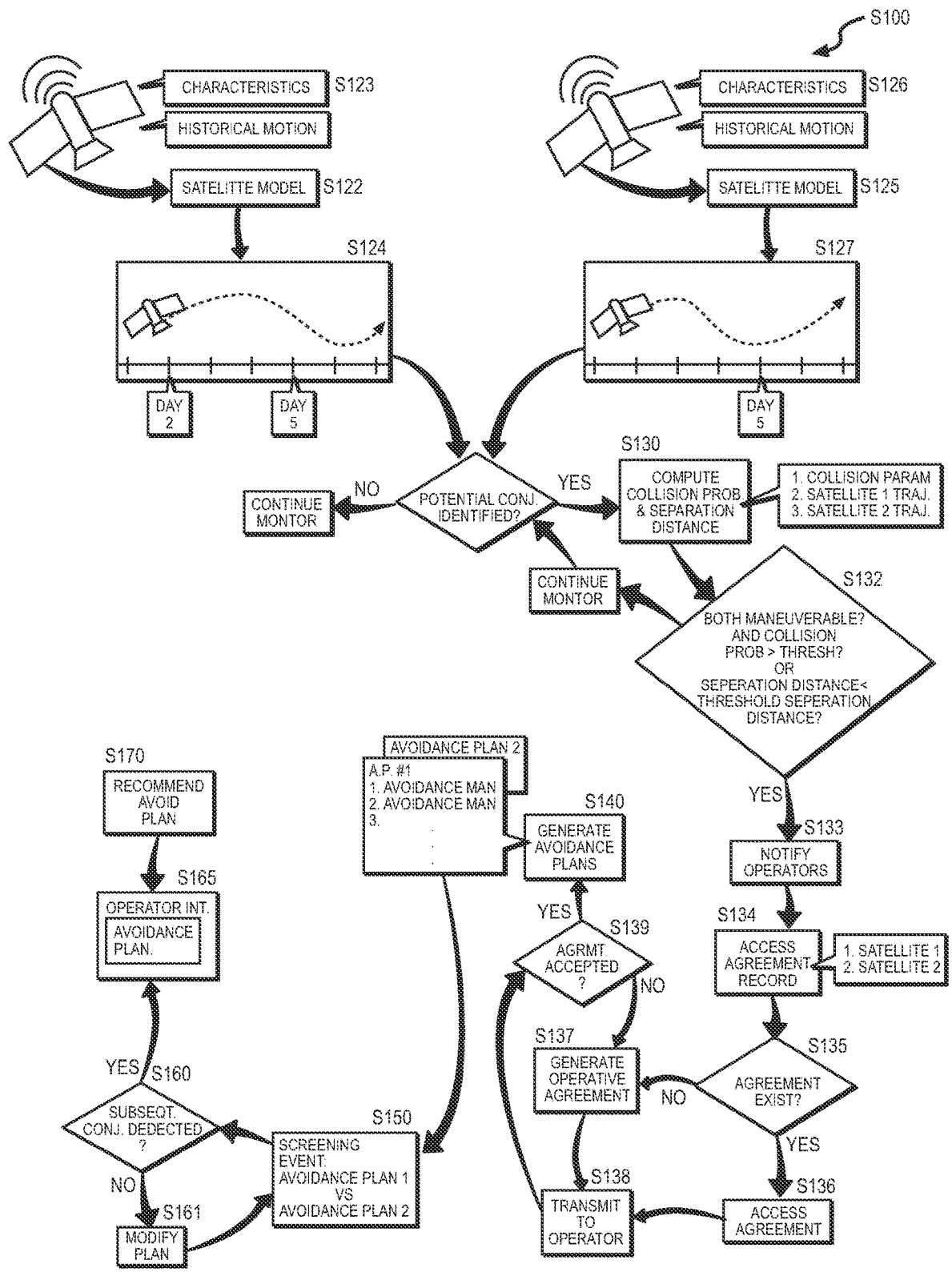
FIG. 3 is a schematic representation of a variation of the method.
Figure 4:
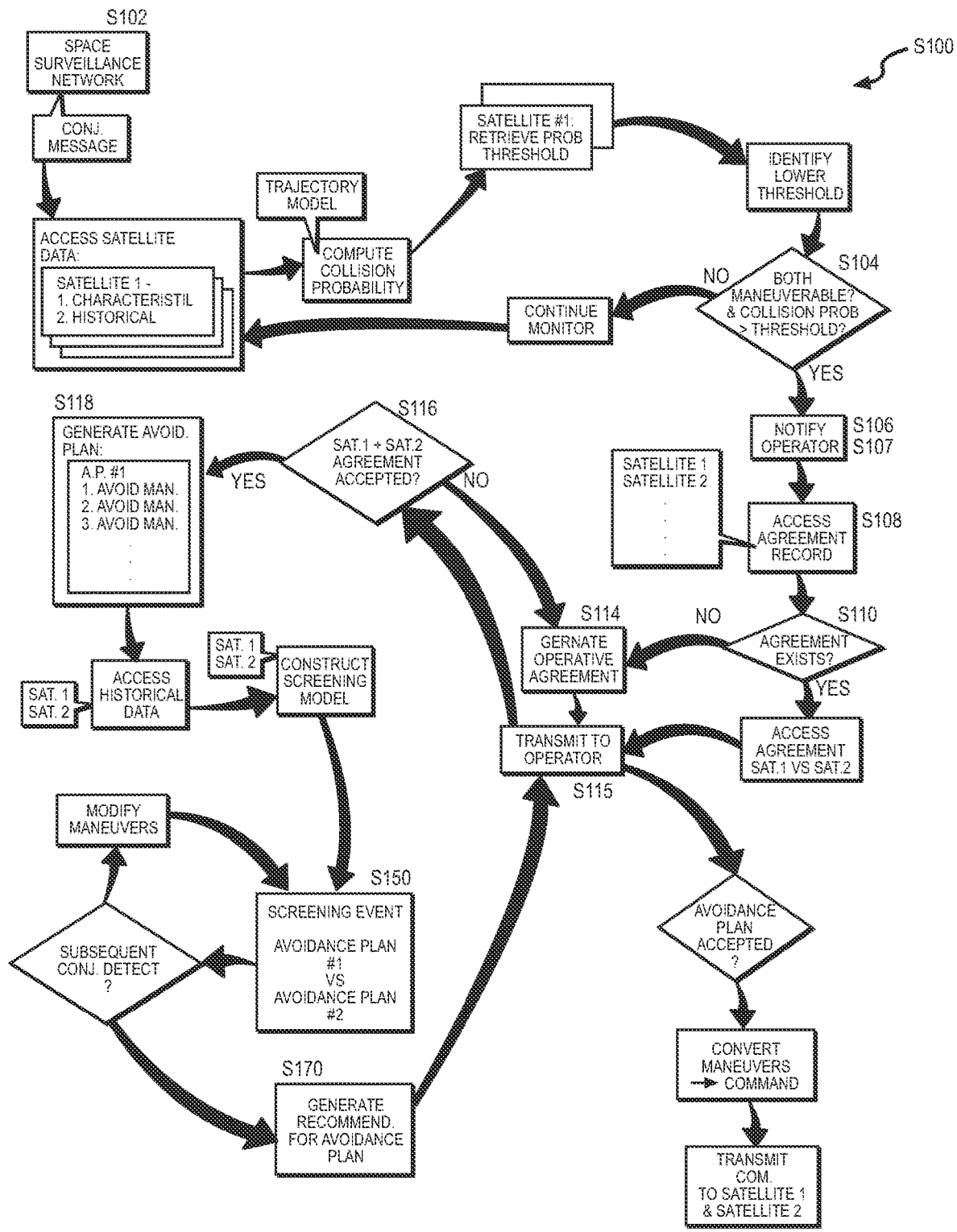
FIG. 4 is a schematic representation of a variation of the method.
Figure 5:
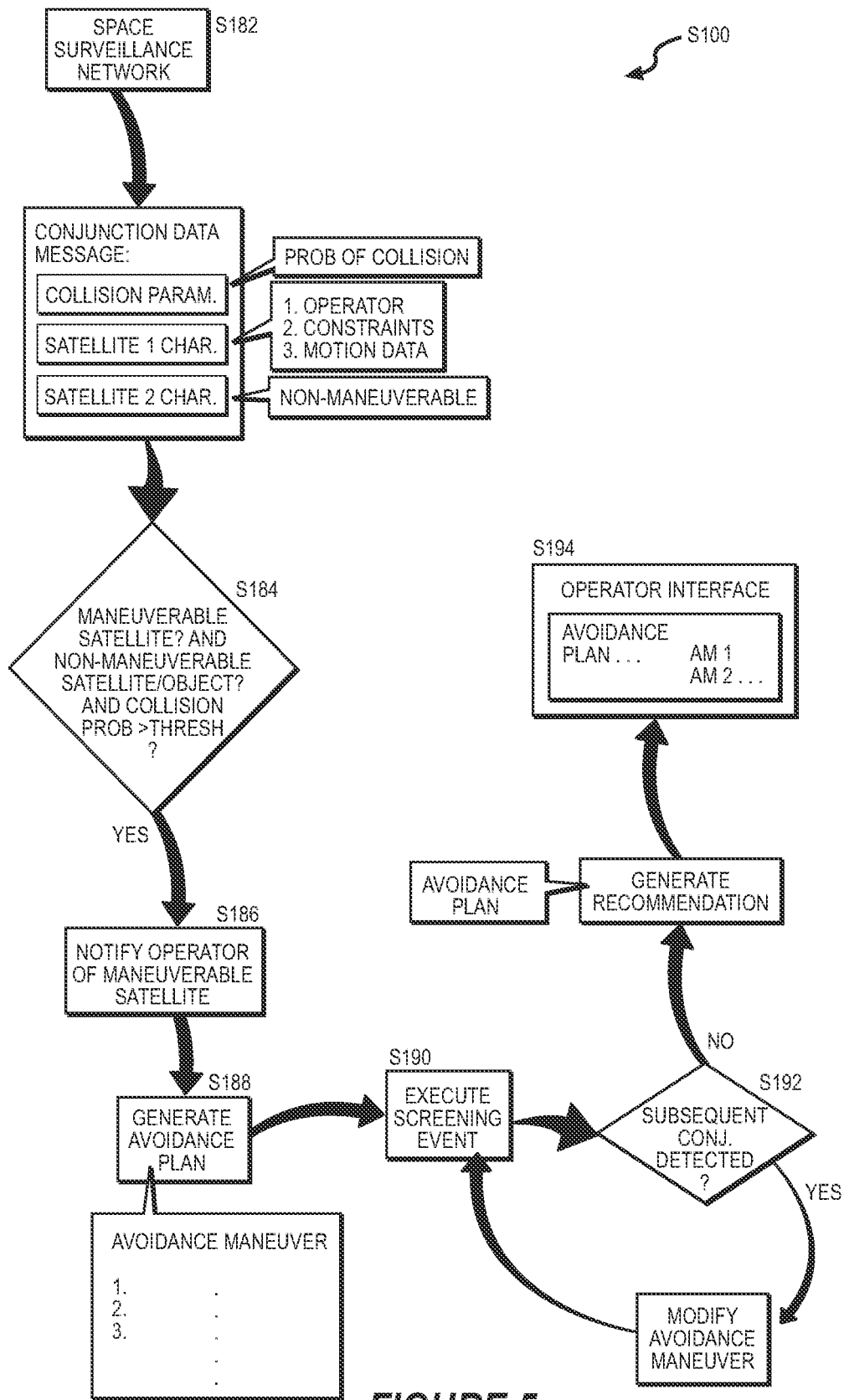
FIG. 5 is a schematic representation of a variation of the method.
Figure 6:
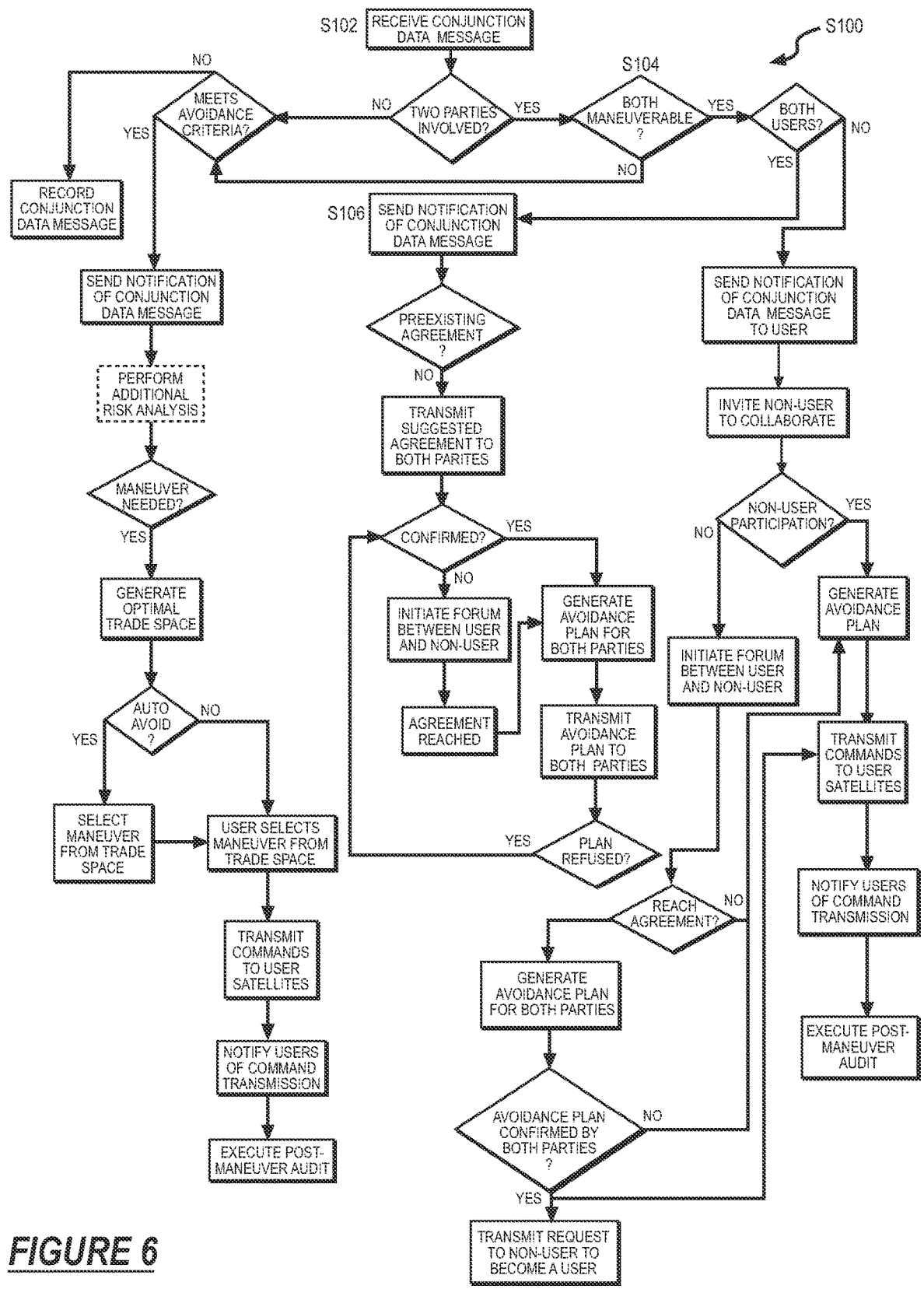
FIG. 6 is a schematic representation of a variation of the method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: Collision Avoidance for Two Maneuverable Satellites

As shown in FIGS. 1-6, a method S100 includes: receiving a conjunction data message representing a first conjunction between a first satellite and a second satellite including a set of conjunction parameters including a probability of collision and a separation distance between the first satellite and the second satellite, a first set of satellite characteristics associated with the first satellite, and a second set of satellite characteristics associated with the second satellite in Block S102. The method S100 further includes: in response to identifying the first satellite as maneuverable based on the first set of satellite characteristics, in response to identifying the second satellite as maneuverable based on the second set of satellite characteristics, and in response to the probability of collision exceeding a threshold probability of collision or the separation distance falling below a threshold separation distance in Block S104, notifying a first satellite operator associated with the first satellite of the first conjunction in Block S106, notifying a second satellite operator associated with the second satellite of the first conjunction in Block S107, and accessing an agreement record for a set of satellite operators including the first satellite operator and the second satellite operator in Block S108. The method S100 further includes: in response to detecting absence of agreement between the first operator and the second operator in the agreement record in Block S110, generating an operative agreement based on the first set of satellite characteristics and the second set of satellite characteristics in Block S114, and transmitting an agreement message to the first satellite operator and the second satellite operator, the agreement message including the operative agreement, and an acceptance element in Block S115. The method S100 further includes: in response to acceptance of the operative agreement by the first satellite operator and the second satellite operator according to the acceptance element in Block S116: generating a first avoidance plan for the first satellite based on the set of conjunction parameters, the first set of satellite characteristics, the second set of satellite characteristics, and the operative agreement, the first avoidance plan including a first set of avoidance maneuvers in Block S118; generating a second avoidance plan for the second satellite based on the set of conjunction parameters, the first set of satellite characteristics, the second set of satellite characteristics, the second avoidance plan including a second set of avoidance maneuvers; transmitting the first avoidance plan to the first satellite operator in Block S118; and transmitting the second avoidance plan to the second satellite operator in Block S120.

1.1 Variation: Orbital Trajectory

One variation of the method S100 includes, for a first satellite: retrieving a first satellite trajectory model associated with the first satellite in Block S122; accessing a first set of satellite characteristics associated with the first satellite in Block S123; and predicting a first orbital trajectory for the first satellite based on the first satellite trajectory model according to the first set of satellite characteristics in Block S124 and, for a second satellite, retrieving a second satellite trajectory model associated with the second satellite in Block S125; accessing a second set of satellite characteristics associated with the second satellite in Block S126; predicting a second orbital trajectory for the second satellite based on the second satellite trajectory model according to the second set of satellite characteristics in Block S127. The method S100 further includes: computing a probability of collision between the first satellite and a second satellite based on the first orbital trajectory and the second orbital trajectory in Block S130; and, in response to identifying the first satellite as maneuverable based on the first set of satellite characteristics, in response to identifying the second satellite as maneuverable based on the second set of satellite characteristics, and in response to the probability of collision exceeding a threshold probability of collision in Block S132, notifying a first satellite operator associated with the first satellite of the first conjunction, and notifying a second satellite operator associated with the second satellite of the first conjunction in Block S133. The method S100 further includes: in response to detecting absence of agreement between the first operator and the second operator in an agreement record for a set of satellite operators including the first satellite operator and the second satellite operator in Block S135, generating an operative agreement based on the first set of satellite characteristics and the second set of satellite characteristics in Block S137, and transmitting an agreement message to the first satellite operator and the second satellite operator, the agreement message including the operative agreement, and an acceptance element in Block S138. The method S100 further includes: in response to acceptance of the operative agreement by the first satellite operator and the second satellite operator according to the acceptance element in Block S139, generating a first avoidance plan for the first satellite based on the first set of satellite characteristics, the second set of satellite characteristics, and the operative agreement, the first avoidance plan including a first set of avoidance maneuvers in Block S140; generating a second avoidance plan for the second satellite based on the first set of satellite characteristics, the second set of satellite characteristics, the second avoidance plan including a second set of avoidance maneuvers in Block S140; generating a first recommendation for the first avoidance plan specifying execution of the first set of avoidance maneuvers within a target period of time in Block S170; generating a second recommendation for the second avoidance plan specifying execution of the second set of avoidance maneuvers within the target period of time in Block S170; transmitting the first recommendation to the first satellite operator in Block S180; and transmitting the second recommendation to the second satellite operator in Block S180.

1.2 Variation: Conjunction Screening

One variation of the method S100 includes: receiving a conjunction data message representing a first conjunction between a first satellite and a second satellite including a set of conjunction parameters including a probability of collision and a separation distance between the first satellite and the second satellite, a first set of satellite characteristics associated with the first satellite, and a second set of satellite characteristics associated with the second satellite in Block S102. The method S100 further includes: in response to identifying the first satellite as maneuverable based on the first set of satellite characteristics, in response to identifying the second satellite as maneuverable based on the second set of satellite characteristics, and in response to the probability of collision exceeding a threshold probability of collision the separation distance falling below a threshold separation distance in Block S104, notifying a first satellite operator associated with the first satellite of the first conjunction in Block S106, notifying a second satellite operator associated with the second satellite of the first conjunction in Block S107; and accessing an agreement record for a set of satellite operators including the first satellite operator and the second satellite operators in Block S108. The method S100 further includes: in response to detecting absence of agreement between the first operator and the second operator in the agreement record in Block S110, generating an operative agreement based on the first set of satellite characteristics and the second set of satellite characteristics in Block S114, and transmitting an agreement message to the first satellite operator and the second satellite operator, the agreement message including the operative agreement, and an acceptance element in Block S115. The method S100 further includes, in response to acceptance of the operative agreement by the first satellite operator and the second satellite operator according to the acceptance element in Block S116: generating a first avoidance plan for the first satellite based on the set of conjunction parameters, the first set of satellite characteristics, the second set of satellite characteristics, and the operative agreement, the first avoidance plan including a first set of avoidance maneuvers in Block S118; generating a second avoidance plan for the second satellite based on the set of conjunction parameters, the first set of satellite characteristics, the second set of satellite characteristics, the second avoidance plan including a second set of avoidance maneuvers in Block S118; executing a first screening event based on the first set of avoidance maneuvers to detect a third conjunction between the first satellite and a third satellite in Block S150; and executing a second screening event based on the second set of avoidance maneuvers to detect a fourth conjunction between the second satellite and a fourth satellite in Block S150. The method S100 further includes; in response to detecting absence of the third conjunction based on the first screening event, transmitting the first avoidance plan to the first satellite operator in Block S165; and in response to detecting absence of the fourth conjunction based on the second screening event, transmitting the second avoidance plan to the second satellite operator in Block S165.

1.3 Variation: Example

One variation of the method S100 includes: receiving a conjunction data message representing a first conjunction between a first satellite and a second satellite including, a set of conjunction parameters including a probability of collision; a first set of satellite characteristics associated with the first satellite; and a second set of satellite characteristics associated with the second satellite in Block S182. The method S100 further includes, in response to identifying the first satellite as maneuverable based on the first set of satellite characteristics, in response to identifying the second satellite as non-maneuverable based on the second set of satellite characteristics, and in response to the probability of collision exceeding a threshold probability of collision in Block S184, notifying a first satellite operator associated with the first satellite of the first conjunction in Block S186, generating a first avoidance plan for the first satellite based on the set of conjunction parameters, the first set of satellite characteristics, the second set of satellite characteristics, the first avoidance plan including a first set of avoidance maneuvers in Block S188, executing a screening event to detect a second conjunction between the first satellite and a third satellite in Block S190, and in response to detecting absence of the second conjunction based on the screening event in Block S192, transmitting the first avoidance plan to the first satellite operator in Block S192.

2. Applications

Generally, the method S100 can be executed by a computer system (e.g., a computer server, a computer network, an on-board satellite computer) in communication with: a space object tracking system providing space situational awareness via conjunction data messages or ephemerides.; a set of satellite operators responsible for controlling orbital trajectories of satellites—tracked by the space object tracking system—via operator interfaces; and/or other sources of tracking data, such as governmental or commercial ground-based or space-based data providers.

The computer system can execute the method S100 to: identify an orbital collision or conjunction (hereinafter "conjunction") between two maneuverable satellites associated with unique operators; notify the satellite operators involved in the conjunction; facilitate an agreement between the satellite operators when no agreement exists; generate mutually compatible avoidance plans for operators that satisfy maneuverability, temporal, operator, and agreement-related constraints to reduce the probability of collision between the satellites involved in the conjunction; and screen the avoidance plans to prevent subsequent conjunctions with other objects.

Therefore, the computer system can execute the method S100 to reduce the probability of collision between: a satellite (e.g., maneuverable) and space debris; and/or between a maneuverable satellite and a non-maneuverable satellite (e.g., foreign operated, government operated). Thus, the computer system can facilitate communication and formal operative agreements between satellite operators while autonomously resolving orbital conjunction events between satellites.

In one implementation, the computer system can identify a conjunction between a set of satellites. For example, within seconds of receiving a conjunction data message from a space object tracking system—such as the space surveillance network operated by a government agency—the computer system can identify: a set of satellites involved in the conjunction; a set of conjunction parameters descriptive of the potential conjunction; and satellite characteristics associated with each satellite. In one variation, the computer system can host a conversation via a digital medium (e.g., via cooperative messaging application or an internal messaging application). By automatically connecting two satellite operators involved in a conjunction, the computer system vastly reduces the time required to coordinate orbital maneuvers to minimize the probability and/or risk of collision, thereby expanding the space of effective avoidance maneuvers.

In another implementation, the computer system can, upon identifying two unique operators associated with the satellites involved in conjunction, identify whether the two operators are currently party to an operative agreement constraining maneuvering options available to either or both operators. In response to identifying that an agreement between operators does not exist, the computer system can generate an operative agreement based on: capabilities and constraints of each party; and/or characteristics of each satellite. The computer system can then deliver the operative agreement to each operator for review and acceptance. Thus, by proposing the operative agreement to each operator, the computer system can reduce the time associated with negotiating an agreement that is fair to both operators and is consistent with the maneuverability and sensing capabilities of each satellite, thereby reducing time and/or risk associated with selecting and initiating avoidance maneuvers between two unique parties.

In another implementation, responsive to acceptance of the operative agreement by both operators, the computer system can identify maneuverability and agreement-related constraints for one or both satellites involved in a conjunction. The computer system can generate an avoidance plan including multiple avoidance maneuvers for each satellite involved in the conjunction. For example, the computer system can generate the avoidance plan based on: the set of conjunction parameters; the operative agreement; and/or the set of satellite characteristics corresponding to each satellite. In another example, the computer system can generate cooperative avoidance plans, such that each operator can select any of the presented avoidance maneuvers without conflicting with an avoidance maneuver presented to the other operator. Thus, the computer system can prevent errors in communication between the operators from inadvertently increasing the probability of collision between two satellites.

In another implementation, the computer system can: execute a set of screening events for each avoidance plan to detect subsequent conjunctions responsive to execution of the avoidance maneuvers. More specifically, in response to executing the avoidance maneuvers, the computer system can cause each satellite involved in the conjunction to change a motion behavior and/or trajectory and decrease the risk of collision with another surrounding object or satellite. For example, the computer system can: execute a screening event based on the set of avoidance maneuvers to detect subsequent conjunction between the satellite and an object in orbit; and, in response to detecting absence of the subsequent conjunction, generate a recommendation including the avoidance maneuvers, and deliver the recommendation to the first satellite operator. In response to detecting a subsequent conjunction based on the avoidance maneuvers, the computer system can: modify a subset of the avoidance maneuvers; and execute a subsequent screening event to evaluate a potential collision based on the updated avoidance maneuvers. Thus, the computer system can minimize the probability of collateral damage due to avoidance maneuvers caused by the satellites associated with the conjunction.

3. Computer System

Generally, the computer system can include a set of computer servers in communication with a space object tracing system and/or a set of satellite operators, such as via email, via an API, via messaging application integration, a software development kit, a web application, or via other Internet communications. Additionally, the computer system can include, or directly communicate with, on-board satellite computers in order to receive real-time orbital data and status information, as well as to initiate avoidance maneuvers via direct communication with these on-board satellite computers. The computer system can include multiple software modules to: transmit notifications and user interfaces to communicate with satellite operators; generate pairwise agreements between satellite operators; calculate orbital solutions for known satellites; and/or generate cooperative avoidance plans to minimize the probability of collision between satellites associated with the conjunction. Furthermore, the computer system can also interact with and maintain multiple databases including: a satellite operator database; and/or an agreement record database; and/or an object trajectory database.

In one implementation, the computer system can directly communicate with satellites associated with the conjunction event via APIs exposed by the satellite operators. In this implementation, the computer system can transmit avoidance maneuvers directly to satellites associated with the conjunction event, thereby further decreasing the time required to execute avoidance maneuvers and improving opportunities to minimize the probability of a collision.

In one implementation, the computer system can directly integrate or communicate with other computer systems associated with the satellite operator. In this implementation, the computer system can transmit avoidance maneuvers to satellites associated with the conjunction event via a third system, thereby further decreasing the time required to execute avoidance maneuvers and improving opportunities to minimize or reduce the probability of a collision.

3.1 Local Orbital Solution

Generally, as shown in FIG. 1, the computer system can monitor orbit of satellites around Earth—including trajectories (or orbital paths) associated with each satellite—based on communications from ground-based towers (or stations). In one implementation, the computer system can: receive orbital solutions for satellites involved in a conjunction from the space object tracking system; and maintain a local orbital solution that represents the position, velocity, and uncertainties (i.e., ephemeris data) for each satellite tracked by the space object tracking system. More specifically, the computer system can receive a set of conjunction data messages and/or orbital solutions from the space object tracking system and, over a time period, generate orbital solutions for objects associated with each conjunction data message. In one variation, the computer system can receive a high accuracy catalog, and/or owner operator ephemerides. Thus, over one or more conjunction data messages and/or orbital solutions provided by the space object tracking system, the computer system can track and propagate orbits for a set of satellites and calculate conjunction probabilities locally between tracked satellites as well as execute more accurate orbital propagation for tracked satellites.

In one implementation, the computer system can store available satellite characteristics in association with each satellite tracked by the local orbital solution. In this implementation, these satellite characteristics can include: maneuverability characteristics such as maximum thrust/acceleration, coefficient of drag, solar radiation pressure coefficient, positioning constraints (e.g., relative to the sun), total mass, specific energy dissipation rate, and/or reception constraints (e.g., orbital regions within which the satellite cannot receive avoidance maneuvers for subsequent execution). Additionally, the computer system can associate a tracked satellite in the local orbital solution with a particular satellite operator of the satellite in the satellite operator database (described below). Thus, the computer system can maintain space situational awareness (hereinafter "SSA") for a set of tracked satellites and associate these satellites with satellite operators in order to improve the accuracy and/or effectiveness of generated agreements and avoidance plans transmitted to satellite operators.

In an alternative implementation, the computer system can rely only on conjunction data messages received from the space object tracing system instead of maintaining independent SSA.

3.6 Satellite Operator Database

In one implementation, the computer system can store satellite operator data within a satellite operator database. For example, the computer system can access satellite operator data, such as: a set of satellites associated with the satellite operator; communication configurations (e.g., a communication frequency); a communication media (e.g., in the form of an email address, messaging application address, or any other internet- or telecommunication-based communication medium); API calls to initiate avoidance maneuvers with specific satellites; and/or pairwise and/or global agreements to which the satellite operator is a party. In this example, the computer system can store the satellite operator data associated with the satellite operator in the satellite operator database. Thus, upon identifying a satellite associated with a conjunction, the computer system can: identify the satellite operator of the satellite; and communicate with the satellite operator regarding the conjunction event.

In one implementation, the computer system can store agreement records associated with each satellite operator party in the satellite operator database. Alternatively, the computer system can store agreement records in a separate database relationally linked to the satellite operator database. For example, responsive to identifying the satellite associated with the conjunction, the computer system can identify agreements associated with the satellite operator in the satellite operator database. Thus, the computer system can access relevant data with which the computer system can execute additional blocks of the method S100 to avoid a conjunction with an alternate satellite.

In one implementation, the computer system can store satellite trajectory data within an object trajectory database. For example, the computer system store a set of object trajectories for a set of space objects, such as: a set of satellites (e.g., the first satellite, the second satellite); a set of space objects (e.g., space matter), etc. More specifically, the computer system can: compute a set of trajectories for the first satellite and a set of objects (e.g., the second satellite) in orbit; and store the set of trajectories in the object trajectory database. Thus, upon detecting a conjunction between a pair of objects, such as the first satellite and the second satellite, the computer system can retrieve trajectory data for each satellite to identify a probability of collision between the pair of satellites to inform a collision avoidance process (e.g., an avoidance plan).

3.3 Satellite Onboarding

In one implementation, the computer system can onboard a set of satellites for conjunction assessment and collision avoidance. For example, during an onboarding period, the computer system can: invite a satellite operator to disclose a satellite profile associated with a satellite; and, in response to acceptance of the invitation by the satellite operator, receive a satellite profile associated with a satellite including satellite data, such as operational data (e.g., maneuverable, non-maneuverable), system constraints (e.g., velocity thresholds), historical orbit data, operator data, etc. The computer system can then: access a set of operative agreements between the satellite and satellite operators; and aggregate the set of operative agreements into the agreement record for a set of satellite operators. Thus, the computer system can execute the method S100 to assess conjunctions involving the satellite and avoid collision (or reduce probability of collision) between the satellite and other surrounding satellites and objects.

4. Satellite Trajectory Prediction+Conjunction Identification

In one implementation, the computer system can: retrieve a satellite trajectory model associated with a satellite; access a set of satellite characteristics descriptive of motion behaviors of the satellite; and insert the satellite characteristics into the satellite trajectory model to predict a trajectory of the satellite. For example, for the first satellite, the computer system can: access a satellite trajectory model associated with the first satellite. The computer system can then: access a set of satellite characteristics, such as a velocity vector, a drag profile, an angle of rotation, and/or a size profile (e.g., diameter) for the first satellite; and access a set of historical motion data associated with the first satellite according to a first anchor time (e.g., a deployment time, 24 hours prior, a week prior). In this example, the computer system can: insert the satellite characteristics and historical motion data into the satellite trajectory model; execute the satellite trajectory model based on a target time; and predict a first orbital trajectory of the first satellite according to the target time in the future (e.g., 5 days, 7 days). The computer system can further predict a second orbital trajectory for the second satellite. Thus, the computer system can evaluate the first and second orbital trajectories associated with each satellite to identify a potential conjunction based on current motion behaviors and characteristics of each satellite.

In one implementation, the computer system can: compare orbital trajectories associated with a set of satellites; and generate a visual representation of the orbital trajectories. For example, the computer system can: access the first orbital trajectory of the first satellite; access the second orbital trajectory of the second satellite; and generate a trajectory map for the first and the second satellites to indicate convergence of the orbital trajectories at the target time. In response to detecting that the first orbital trajectory and the second orbital trajectory converge—indicating collision of the first and the second satellite—the computer system can generate a conjunction data message indicating a conjunction between the first satellite and the second satellite. Thus, the computer system can initiate collision avoidance between the set of satellites by evaluating orbital trajectories of the satellites to communicate a representation of the conjunction to satellite operators of the satellites involved in the potential conjunction.

4.1 Conjunction Data Message Reception

In one implementation, the computer system can receive conjunction data messages and/or orbital solutions (i.e., ephemeris data for satellites tracked by the space object tracing system) from the space object tracing system. More specifically, the computer system can periodically (e.g., on a reporting interval of the space object tracing system) receive conjunction data messages including conjunction parameters and satellite characteristics for each satellite associated with the conjunction. Thus, the computer system can initiate the method S100 by ingesting a conjunction data message to extract and/or enrich the contents of the conjunction data message in order to communicate an accurate representation of the conjunction to satellite operators of the satellites associated with the conjunction data message.

In one implementation, the computer system can receive a conjunction data message (or a similar message containing ephemeris data) from space object tracking system include the Space Surveillance Network (hereinafter "SSN"), European Union Space Surveillance and Tracking (hereinafter, "EUSST"), and/or any other governmental or private source of tracking or ephemeris data, which can include satellite operators. Additionally, the computer system can initiate Blocks of the method S100 in response to receiving a conjunction data message or in response receiving new ephemeris data from external data sources (mentioned above). Thus, the computer system can integrate ephemeris data from multiple sources to generate an accurate prediction of a conjunction between a pair of satellites.

4.2 Contents

In one implementation, the computer system can receive conjunction data messages including conjunction parameters. For example, the computer system can receive a conjunction data message representing a conjunction between a first satellite and a second satellite. More specifically, the set of conjunction parameters can include: a probability of collision; a separation distance (e.g., a miss distance); a time of closest approach (hereinafter "TCA"); a minimum separation distance (e.g., between the first and the second satellite); a minimum radial separation distance; minimum in-track separation distance, a minimum cross-track separation distance; relative velocity at closest approach; relative radial velocity at closest approach; relative in-track velocity at closest approach; and/or relative cross-track velocity at closest approach; as well as uncertainties associated with each of the above parameters. In one variation, the set of conjunction parameters can include a set of analyses, such as: trending analysis; statistical analyses; data velocity analyses, a Mahalanobis distance, etc.

Additionally, the computer system can receive a conjunction data message including characteristics associated with each satellite involved in the conjunction. For example, the computer system can receive a conjunction data message including a first set of satellite characteristics and a second set of satellite characteristics including characteristics such as: maximum thrust/acceleration, coefficient of drag, solar radiation pressure coefficient, total mass, and/or specific energy dissipation rate. Furthermore, the computer system can receive a conjunction data message including ephemeris data for each satellite associated with the conjunction data message. More specifically, the computer system can receive a conjunction data message and/or ephemeris data for a satellite associated with the conjunction data message such as: a semi-major axis of the orbit of the satellite, the eccentricity of the orbit of the satellite, an inclination of the orbit of the satellite, a true anomaly of the orbit of the satellite, an argument of periapsis of the orbit of the satellite, and/or a right ascension of ascending node (hereinafter "RAAN") of the orbit of the satellite). Additionally, the computer system can receive a conjunction data message including a unique ID for each satellite associated with the conjunction data message (e.g., a North America Aerospace Defense Command ID). Thus, the computer system receives a conjunction data message from a space object tracking system that fully summarizes a conjunction according to the orbital propagation algorithms of the space object tracing system as well as identifying and characterizing the satellites associated with the conjunction.

4.3 Collision Probability Computation

In one implementation, the computer system can compute a probability of collision between a set of satellites based on a collision function and characteristics associated with each satellite included in the conjunction data message. For example, the computer system can: receive a conjunction data message representing a first conjunction between a first satellite and a second satellite including a first set of satellite characteristics associated with the first satellite, and a second set of satellite characteristics associated with the second satellite; access a collision function defining a probability of collision between a set of satellites; insert the first set of satellite characteristics and the second set of satellite characteristics into the collision function; and compute a probability of collision between the first satellite and the second satellite based on the collision function.

In one implementation, the computer system can compute a probability of collision between the first satellite and the second satellite based on the orbital trajectory of each satellite. For example, the computer system can: access the first orbital trajectory for the first satellite; access the second orbital trajectory for the second satellite; and compute a probability of collision based on the collision function according to the first orbital trajectory and the second orbital trajectory. Thus, the computer system can directly compute a probability of collision between the first satellite and the second satellite rather than relying on external conjunction messages (e.g., from the space surveillance network) including the probability of collision.

4.4 Collision Probability Tracking+Flagging

In one implementation, the computer system can periodically compute a probability of collision between the set of satellites based on current characteristics. For example, at a first time, the computer system can: retrieve a collision function defining a probability of collision between a set of satellites; access a first set of satellite characteristics associated with the first satellite; and access a first set of satellite characteristics associated with the second satellite. In this example, the computer system can: insert the first set of satellite characteristics and the second set of satellite characteristics into the collision function; and compute a first probability of collision (e.g., 20%) between the first satellite and the second satellite based on the collision function. In this example, at a second time, the computer system can: access a third set of satellite characteristics associated with the first satellite; access a fourth set of satellite characteristics associated with the second satellite; insert the third set of satellite characteristics and the fourth set of satellite characteristics into the collision function; and compute a second probability of collision (e.g., 50%) between the first satellite and the second satellite based on the collision function.

In this implementation, the computer system can track changes in the probability of collision across instances of time to identify a rate of change (e.g., increase) in the probability of collision. For example, at a third time, the computer system can: compute a difference between the first probability of collision and the second probability of collision; and, responsive to the difference exceeding a threshold difference, flag the first satellite and the second satellite, generate a notification prompting investigation of the first satellite and the second satellite, and transmit the notification to a user interface, an email, via text message, or a messaging platform. Thus, the computer system can track changes in the probability of collision between the set of satellites and flag the set of satellites for monitoring when the probability of collision increases too quickly. Therefore, the computer system can monitor when risk of collision between a set of satellites remains within a target (or acceptable) range and increases rapidly during a period of time.

5. Threshold Derivation

In one implementation, the computer system can define thresholds characterizing the probability (or risk) of collision and/or the separation distance between a set of satellites (i.e., the first satellite and the second satellite). For example, the computer system can define a threshold probability of collision (e.g., 70%) for a set of conjunctions (e.g., all). More specifically, each time the computer system receives a conjunction data message including probability of collision (or computes a probability of collision between a set of satellites), the computer system can compare the probability of collision to a threshold probability of collision.

In one variation, the computer system can access operator-specific thresholds. For example, the computer system can: access a parameter profile associated with a set of satellite operators including a first threshold probability of collision (e.g., 85%) corresponding to a first satellite operator associated with the first satellite of the first conjunction, and a second threshold probability of collision (e.g., 90%) corresponding to a second satellite operator associated with the second satellite of the first conjunction. In this example, the computer system can select a lower threshold probability of collision (e.g., 85%) between the first threshold probability of collision and the second threshold probability of collision as a target threshold probability of collision. Thus, the computer system can trigger collision avoidance based on the threshold probability of collision associated with a satellite operator.

5.1 Threshold-Based Conjunction Data Message Analysis and Data Enrichment

In one implementation, the computer system can, in response to identifying greater than a threshold probability of collision in a conjunction data message, perform an additional analysis of the conjunction based on non-linear orbital propagation algorithms and the computer system's local orbital solution. In this implementation, the computer system can improve the accuracy and/or precision of the conjunction parameters included in the conjunction data message and/or refine satellite characteristics by locally propagating orbits of the satellites associated with the conjunction. Additionally, in this implementation, the computer system can improve prediction precision of conjunction parameters via non-linear orbital propagation. Thus, the computer system can refine or add conjunction parameters and/or satellite characteristics before reporting the conjunction data message to satellite operators.

6. Conjunction Confirmation

Generally, the computer system can confirm a conjunction based on maneuverability of each satellite and the probability of collision. In one implementation, the computer system can identify an operation status (e.g., nonoperational, maneuverable) of each satellite according to the set of satellite characteristics associated with each satellite. Additionally, the computer system can access the probability of collision between the first and second satellite. For example, in response to identifying the first satellite as maneuverable based on the first set of satellite characteristics, in response to identifying the second satellite as maneuverable based on the second set of satellite characteristics, and in response to the probability of collision exceeding a threshold probability of collision (or the separation distance falling below the threshold separation distance), the computer system can confirm a first conjunction between the first satellite and the second satellite. In this example, in response to identifying the first satellite as maneuverable (e.g., based on the first set of satellite characteristics), in response to identifying the second satellite as maneuverable (e.g., based on the second set of satellite characteristics), and in response to the probability of collision falling below the threshold probability of collision (or the separation distance exceeds the threshold separation distance), the computer system can: withhold notifying the first and the second operator of the conjunction; and continue monitoring the first satellite and the second satellite until the probability of collision exceeding the threshold probability of collision.

In one variation, the computer system can confirm the conjunction based on the separation distance between the first satellite and the second satellite. For example, the computer system can compute a separation distance between the first satellite and the second satellite based on the first orbital trajectory for the first satellite and the second orbital trajectory for the second satellite. In this example, in response to identifying the first satellite as maneuverable based on the first set of satellite characteristics, in response to identifying the second satellite as maneuverable based on the second set of satellite characteristics, and in response to the separation distance falling below a threshold separation distance, the computer system can: confirm a first conjunction between the first satellite and the second satellite; and notify the operators associated with the first and the second satellites. Thus, the computer system can avoid a collision between the pair of satellites based on the distance between the satellites.

6.2 Conjunction Notification

In one implementation, the computer system can notify each satellite operator of the first conjunction. More specifically, the computer system can transmit a conjunction notification to an interface associated with each satellite operator involved in the conjunction to communicate the conjunction to each satellite operator. For example, the computer system can: initiate a communication channel between the first satellite operator and the second satellite operator; communicate existing agreements between the first and second satellite operators; and/or prompt each satellite operator to enter an operative agreement for the first conjunction and for subsequent conjunctions. In this example, the computer system can transmit a conjunction notification via a messaging application to one or more satellite operators involved in the conjunction notification including: a visual geometry of a closest approach (of the two satellites associated with the conjunction), a probability of collision, distance at closest approach (e.g., total, radial, in-track, and cross-track), a time of closest approach, and/or any other relevant conjunction parameters and/or satellite characteristics that may aid a satellite operator in entering agreement with another satellite operator involved in the conjunction and/or choosing an avoidance maneuver from an avoidance plan to reduce the probability of collision between the two satellites associated with the conjunction.

In one implementation, the computer system can generate a graphical representation of the above-mentioned conjunction parameters and satellite characteristics and transmit this graphical representation to each satellite operator associated with the conjunction in order to more effectively communicate information regarding the conjunction. Alternatively, the computer system can transmit a link to a web application displaying a graphical representation of the above-mentioned conjunction parameters and satellite characteristics. In yet another alternative implementation, the computer system can transmit a link to an application interface or present the conjunction notification via an application executing on a computational device of each satellite operator involved in the conjunction.

6.3 New Operator Invitation+Direct Forum Initiation

In one implementation, the computer system can invite a satellite operator to participate in the conjunction avoidance responsive to detecting the operator absent from the agreement record. For example, responsive to identifying the first satellite as maneuverable, and identifying the second satellite as maneuverable, the computer system can: identify a first operator associated with the first satellite; and identify a second operator associated with the second satellite. The computer system can then: query an agreement record for a set of satellite operators to confirm identity of each satellite operator; and, in response to detecting the first satellite operator in the agreement record, notify the first operator of the first conjunction, and invite the second operator to participate (e.g., opt-in) in the collision avoidance. In this example, the computer system can transmit a conjunction notification including a link to a direct forum or communication channel between two satellite operators involved in the conjunction. More specifically, the link can open a bi-directional chat via an API call to a messaging application or a URL to a web application for communication between the two satellite operators. Thus, in this implementation, the computer system can enable immediate and direct communication between satellite operators upon receiving a conjunction data message.

7. Agreement Identification

In one implementation, the computer system can identify an agreement between operators of the satellites involved in the conjunction. For example, the computer system can access an agreement record for a set of satellite operators including the first satellite operator and the second satellite operator; and identify an agreement between the first operator and the second operator in the agreement record. In this example, in response to identifying an existing operative agreement between the two satellite operators involved in the conjunction, the computer system can transmit a conjunction notification—including the existing agreement—to each operator. In one variation, the computer system can transmit the conjunction notification including a summary of the existing agreement between the two satellite operators involved in the conjunction. Therefore, the computer system can notify the satellite operators of the details of the agreement and reduce subsequent challenges in accessing details pertaining to the mutual operative agreement.

7.1 Agreement Generation

In one implementation, the computer system can generate an operative agreement responsive to detecting absence of a mutual agreement between a set of operators in the agreement record. For example, in response to detecting absence of agreement between the first operator and the second operator in the agreement record, the computer system can generate an operative agreement based on the first set of satellite characteristics and the second set of satellite characteristics. More specifically, the computer system can generate the operative agreement based on maneuverability characteristics of the first and second satellite involved in the conjunction. In this example, the computer system can: access operational capabilities of each satellite operator involved in the conjunction, such as: historical agreement data; and/or historical rejection data. The computer system can then: aggregate the operational capabilities of each satellite operator and the maneuverability characteristics of the first and second satellite to generate the operative agreement. In another example, the computer system can: execute a decision tree or other model based on the operational capabilities of each satellite operator and/or the maneuverability characteristics of the two satellites involved in the conjunction to identify a set of recommended constraints for each satellite operator; and generate the operative agreement including the set of recommended constraints. In this example, the set of recommended constraints can include: directionality constraints; magnitude constraints; and/or mechanical constraints. The computer system can then: transmit an agreement message—including the operative agreement—to the first satellite operator and the second satellite operator. Thus, the computer system can immediately present a recommended operative agreement to the two satellite operators, thereby reducing negotiation time between the two satellite operators and increasing the probability that an agreement is initiated between the two satellite operators.

In one implementation, the computer system can transmit an agreement message including an acceptance element (i.e., a graphical element) indicating acceptance of the recommended operative agreement. For example, upon transmitting the recommended operative agreement to the first satellite operator and the second satellite operator, the computer system can: monitor acceptance of the recommended operative agreement by each satellite operator via the acceptance element. In this example, in response to receiving an input at the acceptance element (e.g., a checked box) from a satellite operator, the computer system can identify that the recommended operative agreement is accepted by the satellite operator. Thus, in response to both satellite operators indicating agreement via the acceptance element, the computer system can proceed to execute blocks of the method S100 based on the constraints of the operative agreement to generate avoidance plans for the satellites and avoid collision between the first satellite and the second satellite.

8. Avoidance Plan Generation

In one implementation, the computer system can generate avoidance plans for the set of satellites involved in the first conjunction. For example, in response to acceptance of the recommended operative agreement by the first satellite operator and the second satellite operator via the acceptance element, the computer system can: generate a first avoidance plan for the first satellite; and generate a second avoidance plan for the second satellite. More specifically, the computer system can: generate a first avoidance plan for the first satellite based on the set of conjunction parameters, the first set of satellite characteristics, the second set of satellite characteristics, and the recommended operative agreement; and generate a second avoidance plan for the second satellite based on the set of conjunction parameters, the first set of satellite characteristics, and the second set of satellite characteristics. In one variation, the computer system can solve a multi-objective constrained optimization problem based on constraints including maneuverability constraints of each satellite from both sets of satellite characteristics, agreement-related constraints from the operative agreement between the satellite operators, and temporal and geometric constraints from the conjunction parameters of the conjunction. Additionally, the computer system can utilize orbital mechanics equations and non-linear uncertainty propagation to simulate the effect of each avoidance maneuver included in the avoidance plan. In this implementation, the computer system can change the priority or weight of the multi-objective constrained optimization problem to generate a set of distinct avoidance maneuvers, which may provide diverse advantages to the satellite operator. Thus, the computer system can recommend each avoidance plan to the respective satellite operator for acceptance and execution for collision avoidance.

In one implementation, the computer system can generate an avoidance plan for a single maneuverable satellite involved in the conjunction. For example, based on constraints associated with a satellite, the computer system can generate an operative agreement specifying: generation of a first avoidance plan for the first satellite; and withholding generation of a second avoidance plan for the second satellite. In this example, the computer system can: generate a first avoidance plan for the first satellite based on the set of conjunction parameters, the first set of satellite characteristics, the second set of satellite characteristics, and the recommended operative agreement; and withhold generating a second avoidance plan for the second satellite. Thus, the computer system can trigger only one satellite in the set of satellites involved in the conjunction to execute a set of avoidance maneuvers when constraints prevent the second satellite from performing maneuvers to avoid the collision.

8.1 Historical Avoidance Plan Retrieval

In one implementation, the computer system can: identify a previously recommended avoidance plan for a previously confirmed conjunction involving the first satellite; and recommend the avoidance plan to the operator for a current conjunction between the first satellite and the second satellite. For example, in response to acceptance of the operative agreement by the first satellite operator and the second satellite operator, the computer system can: query the first satellite operator database associated with the first satellite operator based on the set of conjunction parameters and/or the first set of characteristics for the first satellite; responsive to identifying a set of avoidance maneuvers previously accepted and executed by the first satellite operator, identify the avoidance plan; retrieve the avoidance plan associated with the set of executed avoidance maneuvers from the first satellite operator database; and present the avoidance plan to the first satellite operator. Therefore, the computer system can reduce computational expenditure associated with generating avoidance plans by retrieving historical avoidance plans that the computer system previously executed to avoid a collision.

8.2 Avoidance Maneuvers

Generally, the computer system can generate an avoidance maneuver to be executed by the satellite at a specific time of execution in order to transition the satellite into a new orbit. In one implementation, the computer system can generate a unique set of avoidance maneuvers for each avoidance plan associated with each satellite. More specifically, the computer system can: generate the first avoidance plan for the first satellite including a first set of avoidance maneuvers; and generate the second avoidance plan for the second satellite including a second set of avoidance maneuvers. For example, the set of avoidance maneuvers can include: a change in speed; a change in inclination or orbit orientation (e.g., 2 degrees); a change in direction (e.g., left); a change in a computer system parameter (e.g., an angle of a solar panel); a change in a drag profile, etc. Thus, the computer system can execute the set of avoidance maneuvers for each satellite to reduce the probability of collision.

In another example, the computer system can generate a set of avoidance plans including complementary avoidance maneuvers. For example, the computer system can: generate a first avoidance plan for a first satellite associated with the first conjunction and a second avoidance plan for a second satellite associated with the first conjunction such that none of the avoidance maneuvers included in the first avoidance plan conflict with (e.g., increase the probability of collision) any of the avoidance maneuvers included in the second avoidance plan. Thus, by generating a complementary and diverse set of avoidance maneuvers for each satellite associated with the conjunction, the computer system can provide flexibility to satellite operators while still reducing the probability of collision between the satellites associated with the conjunction.

In one implementation, the computer system can generate an orbital parameter message (hereinafter "OPM") file for each avoidance maneuver. An OPM file can include: a time of execution or ignition; an order of execution relative to other avoidance maneuvers (e.g., first, second); a duration; a delta mass; and/or a velocity vector for the maneuver. Thus, the computer system can generate avoidance maneuvers in a format that is compatible by a wide variety of satellite systems.

8.3 Avoidance Maneuver Prioritization

In one implementation, the computer system can generate an avoidance plan including a set of prioritized avoidance maneuvers for each satellite associated with the conjunction. More specifically, the computer system can prioritize avoidance maneuvers associated with each avoidance plan based on constraints and conjunction parameters. For example, the computer system can access a set of constraints including: maneuverability constraints of each satellite from both sets of satellite characteristics; agreement-related constraints from the operative agreement between the satellite operators, operator-specific constraints; and temporal and geometric constraints from the conjunction parameters of the conjunction. The computer system can then: access the conjunction parameters associated with the first conjunction; and prioritize avoidance maneuvers associated with the avoidance plan based on the constraints and the conjunction parameters. In this example, for the first avoidance plan, the computer system can prioritize execution (e.g., execute first) of a change in speed of the first satellite; and, for the second avoidance plan, prioritize a change in direction of the second satellite. Thus, upon execution of the avoidance maneuvers, the computer system can execute each avoidance maneuver according to a corresponding priority.

8.4 Maneuver Screening

Generally, upon generating an avoidance maneuver, the computer system can screen the avoidance maneuver against known orbital trajectories of other satellites not associated with the conjunction to ensure that no additional conjunctions are caused with surrounding satellites by initiating the avoidance maneuver. In one implementation, the computer system can propagate a post-maneuver trajectory of the satellite after initiating the avoidance maneuver and detect intersections between this post-maneuver trajectory and the propagated orbits of other satellites based on the local orbital solution or a most-recent solution received from a space object catalog. Upon detecting an intersection, the computer system can modify or eliminate the avoidance maneuver from the avoidance plan.

In one implementation, the computer system can construct a screening model based on historical data associated with the satellite. For example, the computer system can: access a time series of historical position data including time stamped positions (e.g., a trajectory) of the satellite during a target time range (e.g., last 24 hours, last week, last month); and construct a model for the satellite based on the time series of historical position data. In one variation, the computer system can access a screening model from the satellite operator database associated with the satellite operator. The computer system can then: execute a screening event for the avoidance maneuver by inserting a set of avoidance maneuvers into the screening model. Based on the screening event, the computer system can: estimate (or predict) a change in satellite characteristics (e.g., position, velocity) of the satellite according to the avoidance maneuver; and detect a subsequent conjunction between the satellite and a surrounding object (e.g., satellites) based on the change in satellite characteristics. More specifically, the computer system can: execute a first screening event based on the first set of avoidance maneuvers to detect a third conjunction between the first satellite and a third satellite within a target time period (e.g., 5 days); and execute a second screening event based on the second set of avoidance maneuvers to detect a fourth conjunction between the second satellite and a fourth satellite within the target time period. In this example, in response to detecting a subsequent conjunction based on the screening event according to the set of avoidance maneuvers, the computer system can generate a new avoidance plan for the satellite including a new (e.g., modified) set of avoidance maneuvers. Thus, the computer system can minimize the probability of collateral damage due to avoidance maneuvers caused by the satellites associated with the conjunction.

8.5 Avoidance Plan Modification

Generally, the computer system can execute a set of avoidance parameters to avoid a collision between a set of satellites by changing a trajectory of each satellite. However, by changing the trajectory of one or more satellites, the computer system can cause an additional conjunction with surrounding satellites by initiating the avoidance maneuver. In one implementation, the computer system can modify a set of avoidance maneuvers for an avoidance plan associated with a satellite. For example, in response to detecting a subsequent conjunction based on the screening event for the set of avoidance maneuvers, the computer system can modify a subset of the avoidance maneuvers. More specifically, the computer system can: modify a magnitude associated with an avoidance maneuver (e.g., increase velocity, degree of direction); remove an avoidance maneuver from the set of avoidance maneuvers; and/or append a new avoidance to the avoidance plan, to generate a new set of avoidance maneuvers for the satellite. In this example, the computer system can execute a screening event based on the new set of avoidance maneuvers to detect subsequent conjunction between the satellite and a surrounding object. Thus, the computer system can modify avoidance maneuvers according to conjunction parameters and satellite characteristics to prevent delivery of an avoidance plan that can cause a subsequent conjunction with another object following execution of the avoidance plan.

9. Recommendation Generation

Generally, upon generating an avoidance plan including a set of avoidance maneuvers, the computer system can transmit the avoidance plan to a satellite operator. In one implementation, the computer system can: generate a recommendation for the avoidance plan; and transmit the recommendation to the operator. For example, in response to detecting absence of a subsequent conjunction based on the screening event, the computer system can transmit the avoidance plan to the satellite operator. In another example, the computer system can generate a recommendation for the avoidance plan specifying execution of the avoidance plan within a target period of time (e.g., withing 12 hours) of reception of the recommendation in response to detecting absence of a subsequent conjunction based on the screening event. In another example, the recommendation can include the OPM files for each of the avoidance maneuvers. The computer system can then transmit the recommendation of the avoidance plan to a satellite operator. In one variation, the computer system can generate a recommendation for the avoidance plan including labels indicating a target optimization objective (e.g., a proportionally-higher weighted objective) corresponding to each avoidance maneuver included in the avoidance plan. Thus, the computer system can deliver a set of avoidance maneuver options in the form of an avoidance plan, thereby enabling the satellite operator to select an avoidance maneuver that best aligns with the priorities of the satellite operator.

In one implementation, the computer system can include a link or embedded graphics corresponding to each avoidance maneuver in the avoidance plan. For example, the computer system can include the embedded graphics representing a simulated conjunction event between the two satellites upon execution of the corresponding avoidance maneuver. In this example, the computer system can render a graphical comparison of the conjunction event absent execution of an avoidance maneuver with the conjunction event after execution of the avoidance maneuver. Additionally or alternatively, the computer system can render a graphical comparison of the conjunction event after execution of two different avoidance maneuvers, thereby enabling the satellite operator to better evaluate avoidance maneuvers in the avoidance plan.

10. Execution Confirmation

In one implementation, upon delivery of the recommendation including the avoidance plan, the computer system can generate a prompt instructing each satellite operator to confirm execution of the avoidance plan. For example, responsive to transmitting the avoidance plan (or recommendation including the avoidance plan) to the interface associated with the satellite operator, the computer system can: generate a prompt—directed to the satellite operator—to confirm execution of the avoidance plan within the target period of time; and deliver the prompt to the interface associated with the satellite operator. In this example, the computer system can receive a confirmation from the satellite operator indicating execution of the set of avoidance maneuvers specified by the avoidance plan; and store the avoidance plan for the satellite in the satellite operator database associated with the satellite operator. Thus, once the computer system receives an indication that each satellite operator has accepted and authorized execution of the avoidance plan, the computer system can store an indication of successful generation and compliance of the avoidance plan for each satellite operator.

In one implementation, the computer system can receive a rejection of the recommended avoidance plan. For example, responsive to delivering the confirmation prompt to the interface associated with the first satellite operator, the computer system can receive an indication specifying rejection of the avoidance plan by the satellite operator. In this example, the computer system can receive the indication specifying a reason for rejection of the recommended avoidance plan. The computer system can then generate a new avoidance plan for the first satellite—including a new set of avoidance maneuvers—based on: the reason for rejection; the set of conjunction parameters; the first set of satellite characteristics; the second set of satellite characteristics; and the operative agreement. Thus, the computer system can generate a new avoidance plan to avoid the collision that is in compliance with the operative agreement and satisfies the satellite operator.

In another example, responsive to delivering the confirmation prompt to the interface associated with the satellite operator, the computer system can receive a notification indicating failure of avoidance plan execution within the target time period (e.g., within 24 hours). For example, for the second satellite, the computer system can receive a notification indicating failure of execution of the second avoidance plan by the second satellite operator. In this example, the computer system can update the avoidance plan for the second satellite based on a new set of conjunction parameters and a set of characteristics for the second satellite. Therefore, the computer system can update avoidance plans based on new motion behaviors of the satellite when the computer system identifies expiration of the target time of execution associated with the avoidance plan.

11. Automated Maneuver Execution

In one implementation, the computer system can autonomously execute an avoidance maneuver on behalf of one or both satellite operators involved in the conjunction. For example, the computer system can: access a satellite-specific control program; and convert the avoidance maneuver into a satellite-compatible command specifying execution of the avoidance maneuver. In this example, the computer system can receive the satellite-specific control program from the satellite operator to convert an avoidance maneuver (e.g., in the form of an OPM file) into an executable maneuver by the satellite. More specifically, based on the control program associated with the satellite, the computer system can: autonomously generate a first set of commands specifying execution of the first set of avoidance maneuvers. In this example, each command in the first set of commands can correspond to an avoidance maneuver in the first set of avoidance maneuvers. The computer system can then transmit the first set of commands to the first satellite for execution by the satellite. In one variation, the computer system can then autonomously interface with a ground communication station to transmit the command to the satellite for execution. In one variation, responsive to receiving the confirmation from the satellite operator indicating execution of the set of avoidance maneuvers, the computer system can: autonomously generate the set of commands corresponding to the avoidance maneuvers based on the control program associated with the satellite; and transmit the set of commands to the satellite (e.g., for execution by the satellite). Thus, in this implementation, the computer system can autonomously execute avoidance maneuvers for both satellites involved in a conjunction event while abiding by agreement-related constraints, maneuverability constraints, and collision constraints without involvement of satellite operators.

12. Maneuver Reporting and Feedback

Generally, upon autonomous or manual execution (i.e., by the satellite operator) of an avoidance maneuver, the computer system can report and evaluate the success of the avoidance maneuver and, in response to detecting that the maneuver was not effectively executed by the satellite, execute Blocks of the method S100 to generate a new avoidance plan. More specifically, upon detecting execution of an avoidance maneuver, the computer system can: transmit the OPM file representing the avoidance maneuver to the space object tracing system for inclusion in a subsequent solution generated by the space object tracing system; simulate the effect of the avoidance maneuver in a local orbital solution; receive a subsequent solution generated by the space object tracing system; calculate a deviation between the received subsequent solution and the simulated solution; and, in response to the deviation exceeding a threshold deviation, identify an execution failure. Thus, the computer system can automatically evaluate the success of an avoidance maneuver, thereby enabling further intervention prior to the conjunction.

In one implementation, instead of relying upon an orbital solution received from the space object tracing system, the computer system can generate a simulated orbital solution and compare the simulated orbital solution to a subsequent local orbital solution and, upon calculating a deviation between the simulated orbital solution and a subsequent local orbital solution greater than the threshold deviation, identifying an execution failure. Additionally or alternatively, the computer system can, upon identifying an execution failure, generate a failure notification of transmission to the satellite operator. The computer system can transmit a failure notification including an updated conjunction notification after partial execution or absent execution of the avoidance maneuver by the satellite. Additionally, the computer system can transmit a failure notification including a description of the actual maneuver executed by the satellite in the case of a partial maneuver. Furthermore, the failure notification can include an updated avoidance plan such that the satellite operator can take additional action to reduce the probability of collision during an upcoming conjunction.

13. Variation: Single Satellite Maneuverability

Generally, the computer system can avoid collision between two maneuverable satellites. In one implementation, the computer system can avoid a collision between a maneuverable satellite and a non-maneuverable satellite and/or between a maneuverable satellite and a space object (e.g., debris). For example, the computer system can receive a conjunction data message representing a first conjunction between a first satellite and a second satellite (or space object) including: a set of conjunction parameters including a probability of collision; a first set of satellite characteristics associated with the first satellite; and a second set of satellite characteristics associated with the second satellite. The computer system can then identify maneuverability of the first satellite and the second satellite based on each set of satellite characteristics. For example, in response to identifying the first satellite as maneuverable based on the first set of satellite characteristics, in response to identifying the second satellite as non-maneuverable based on the second set of satellite characteristics, and in response to the probability of collision exceeding a threshold probability of collision, the computer system can: notify a first satellite operator associated with the first satellite of the first conjunction; and generate an avoidance plan—including a set of avoidance maneuvers—for the first satellite based on the set of conjunction parameters, the first set of satellite characteristics, the second set of satellite characteristics, and the first avoidance plan. In this example, the computer system can then execute a screening event to detect a second conjunction between the first satellite and a third satellite (or space object) based on the set of avoidance maneuvers; and, in response to detecting absence of the second conjunction based on the screening event, deliver the first avoidance plan to the first satellite operator. Thus, the computer system can execute the method S100 to avoid collision between a maneuverable satellite and an object in orbit that cannot be controlled (e.g., non-maneuverable).

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, voice assistant, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, solid state drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    receiving a conjunction data message representing a first conjunction between a first satellite and a second satellite including:
        a set of conjunction parameters including:
            a probability of collision; and
            a separation distance between the first satellite and the second satellite;
        a first set of satellite characteristics associated with the first satellite; and
        a second set of satellite characteristics associated with the second satellite; and
    in response to identifying the first satellite as maneuverable based on the first set of satellite characteristics, in response to identifying the second satellite as maneuverable based on the second set of satellite characteristics, and in response to the probability of collision exceeding a threshold probability of collision or the separation distance falling below a threshold separation distance:
        notifying a first satellite operator associated with the first satellite of the first conjunction;
        notifying a second satellite operator associated with the second satellite of the first conjunction;
        accessing an agreement record for a set of satellite operators including the first satellite operator and the second satellite operator;
        in response to detecting absence of agreement between the first operator and the second operator in the agreement record:
            generating an operative agreement based on the first set of satellite characteristics and the second set of satellite characteristics, and
            transmitting an agreement message to the first satellite operator and the second satellite operator, the agreement message including the operative agreement, and an acceptance element; and
        in response to acceptance of the operative agreement by the first satellite operator and the second satellite operator according to the acceptance element:
            generating a first avoidance plan for the first satellite based on the set of conjunction parameters, the first set of satellite characteristics, the second set of satellite characteristics, and the operative agreement, the first avoidance plan including a first set of avoidance maneuvers;
            generating a second avoidance plan for the second satellite based on the set of conjunction parameters, the first set of satellite characteristics, the second set of satellite characteristics, the second avoidance plan including a second set of avoidance maneuvers;
            transmitting the first avoidance plan to the first satellite operator; and
            transmitting the second avoidance plan to the second satellite operator.

2. The method of claim 1, further comprising, in response to acceptance of the operative agreement by the first satellite operator and the second satellite operator according to the acceptance element:
    accessing a first time series of historical position data including time stamped positions of the first satellite during a target time range;
    constructing a first screening model for the first satellite based on the first time series of historical position data;
    accessing a second time series of historical position data including time stamped positions of the second satellite during the target time range; and
    constructing a second screening model for the second satellite based on the second time series of historical position data.

3. The method of claim 2, further comprising, in response to acceptance of the operative agreement by the first satellite operator and the second satellite operator according to the acceptance element:
    executing a first screening event based on the first screening model according to the first set of avoidance maneuvers to detect a third conjunction between the first satellite and a third satellite; and
    executing a second screening event based on the second screening model according to the second set of avoidance maneuvers to detect a fourth conjunction between the second satellite and a fourth satellite.

4. The method of claim 3, further comprising, in response to acceptance of the operative agreement by the first satellite operator and the second satellite operator according to the acceptance element:
- transmitting the first avoidance plan to the first satellite operator in response to detecting absence of the third conjunction based on the first screening event; and
- transmitting the second avoidance plan to the second satellite operator in response to detecting absence of the fourth conjunction based on the second screening event.

5. The method of claim 4, further comprising, in response to detecting the third conjunction based on the first screening event:
- modifying a first subset of the first avoidance maneuvers to generate a third set of avoidance maneuvers;
- executing a third screening event based on the first screening model according to the third set of avoidance maneuvers; and
- in response to detecting absence of a fifth conjunction associated with the first satellite based on the third screening event:
  - updating the first avoidance plan with the third set of avoidance maneuvers; and
  - transmitting the first avoidance plan to the first satellite operator.

6. The method of claim 3, further comprising:
- in response to detecting absence of the fourth conjunction based on the second screening event:
  - modifying a second subset of the second avoidance maneuvers to generate a fourth set of avoidance maneuvers;
  - executing a fourth screening event based on the second screening model according to the fourth set of avoidance maneuvers; and
  - in response to detecting absence of a sixth conjunction associated with the second satellite based on the fourth screening event:
    - updating the second avoidance plan with the fourth set of avoidance maneuvers; and
    - transmitting the second avoidance plan to the second satellite operator.

7. The method of claim 1, further comprising, in response to identifying the first satellite as maneuverable based on the first set of satellite characteristics, in response to identifying the second satellite as non-maneuverable based on the second set of satellite characteristics, and in response to the probability of collision exceeding a threshold probability of collision:
- notifying a first satellite operator associated with the first satellite of the first conjunction;
- generating a first avoidance plan for the first satellite based on the set of conjunction parameters, the first set of satellite characteristics, the second set of satellite characteristics, and the first avoidance plan including a first set of avoidance maneuvers;
- executing a screening event to detect a second conjunction between the first satellite and a third satellite; and
- in response to detecting absence of the second conjunction based on the screening event, transmitting the first avoidance plan to the first satellite operator.

8. The method of claim 1:
- wherein transmitting the first avoidance plan to the first satellite operator comprises:
  - transmitting the first avoidance plan to a first interface associated with the first satellite operator; and
  - prompting the first satellite operator to accept the first avoidance plan at the first interface for execution of the first set of avoidance maneuvers within a target period of time; and
- wherein transmitting the second avoidance plan to the second satellite operator comprises:
  - transmitting the second avoidance plan to a second interface associated with the second satellite operator; and
  - prompting the second satellite operator to accept the second avoidance plan at the second interface for execution of the second set of avoidance maneuvers within the target period of time.

9. The method of claim 8, further comprising:
- in response to detecting acceptance of the first avoidance plan at the first interface:
  - autonomously generating a first set of commands specifying execution of the first set of avoidance maneuvers, each command in the first set of commands corresponding to an avoidance maneuver in the first set of avoidance maneuvers; and
  - transmitting the first set of commands to the first satellite; and
- in response to detecting acceptance of the second avoidance plan at the first interface:
  - autonomously generating a second set of commands specifying execution of the second set of avoidance maneuvers, each command in the second set of commands corresponding to an avoidance maneuver in the second set of avoidance maneuvers; and
  - transmitting the second set of commands to the second satellite.

10. The method of claim 9, further comprising, in response to detecting partial execution of the first set of commands associated with the first avoidance plan by the first satellite:
- generating a failure notification specifying a subset of commands executed by the first satellite according to the partial execution of the first set of commands;
- generating a third avoidance plan for the first satellite including a third set of avoidance maneuvers, the third avoidance plan different than the first avoidance plan; and
- transmitting the failure notification and the third avoidance plan to the first interface associated with the first satellite operator.

11. The method of claim 1, further comprising, in response to identifying an operative agreement between the first satellite operator and the second satellite operator in the agreement record, transmitting a second agreement message to the first satellite operator and the second satellite operator, the second agreement message including the operative agreement, and the acceptance element.

12. The method of claim 1, further comprising:
- generating a first recommendation for the first avoidance plan specifying execution of the first set of avoidance maneuvers within a target period of time;
- generating a second recommendation for the second avoidance plan specifying execution of the second set of avoidance maneuvers within the target period of time;
- transmitting the first recommendation to a first interface associated with the first satellite operator; and
- transmitting the second recommendation to a second interface associated with the second satellite operator.

13. The method of claim 1, wherein notifying the first satellite operator and the second satellite operator of the first conjunction comprises:
   generating a graphical representation descriptive of the first conjunction based on the set of conjunction parameters, first set of satellite characteristics, and the second set of satellite characteristics;
   transmitting the graphical representation to a first interface associated with the first satellite operator; and
   transmitting the graphical representation to a second interface associated with the second satellite operator.

14. A method comprising:
   receiving a conjunction data message including:
      a set of conjunction parameters including a probability of collision;
      a first set of satellite characteristics for a first satellite; and
      a second set of satellite characteristics for a second satellite; and
   in response to identifying the first satellite as maneuverable, in response to identifying the second satellite as maneuverable, and in response to the probability of collision exceeding a threshold probability of collision:
      accessing an agreement record for a set of satellite operators; and
      in response to detecting absence of agreement between the first operator and the second operator in the agreement record:
         generating an operative agreement based on the first set of satellite characteristics and the second set of satellite characteristics, and
         transmitting an agreement message to the first satellite operator and the second satellite operator; and
   in response to acceptance of the operative agreement by the first satellite operator and the second satellite operator:
      generating a first avoidance plan for the first satellite;
      generating a second avoidance plan for the second satellite;
      executing a first screening event based on the first avoidance plan to detect a third conjunction between the first satellite and a third satellite;
      executing a second screening event based on the second avoidance plan to detect a fourth conjunction between the second satellite and a fourth satellite;
      in response to detecting absence of the third conjunction based on the first screening event, transmitting the first avoidance plan to the first satellite operator; and
      in response to detecting absence of the fourth conjunction based on the second screening event, transmitting the second avoidance plan to the second satellite operator.

* * * * *